United States Patent [19]

Yasuda et al.

[11] 4,409,469
[45] Oct. 11, 1983

[54] OPTICAL BAR CODE READER

[75] Inventors: Syoichi Yasuda; Takaaki Okamoto, both of Nara; Kenrow Yatsunami, Yamatokoriyama; Shigeo Terashima, Tenri; Masahiro Horii, Nara; Yoshihiko Iwamoto, Sakurai; Kiyotsugu Amasaki, Nara, all of Japan

[73] Assignee: Sharp Kabushiki Kaisha, Osaka, Japan

[21] Appl. No.: 226,864

[22] Filed: Jan. 21, 1981

[30] Foreign Application Priority Data

Jan. 21, 1980 [JP] Japan .................................. 55-5989
Jan. 23, 1980 [JP] Japan .................................. 55-7450

[51] Int. Cl.³ .............................................. G06K 7/14
[52] U.S. Cl. .................................. 235/463; 235/454; 235/467; 235/462
[58] Field of Search ....................... 235/462, 467, 454; 350/6.4

[56] References Cited

U.S. PATENT DOCUMENTS

3,978,317  8/1976  Yamaguchi .................... 235/467
4,289,957  9/1981  Neyroud ........................ 235/467

Primary Examiner—Harold I. Pitts
Attorney, Agent, or Firm—Birch, Stewart, Kolasch & Birch

[57] ABSTRACT

An optical bar code reader includes a recognition system for recognizing a bar code data even when none of a plurality of scanning beams extend over the entire width of a bar code label. A plurality of incomplete data each of which represents a portion of the bar code label are combined with each other by a composition circuit to get an estimated complete bar code data. A determination system is provided for detecting whether the read out data obtained from any scanning beam corresponds to the entire bar code data. If an affirmative answer is obtained by the determination system, such read out data is directly applied to the associated processing system without activating the composition circuit.

3 Claims, 18 Drawing Figures

PRIOR ART

OPTICAL BAR CODE READER

BACKGROUND AND SUMMARY OF THE INVENTION

The present invention relates to an optical bar code reader and, more particularly, to a recognition system in an optical reader for reading out coded information disposed on a commodity article.

Recently, the point of sales (POS) system has been developed, wherein coded information related to a commodity price and a commodity classification is printed on a tag card attached to a commodity article, and the coded information is read out through the use of an optical reader system. In such an optical reader system, there is a great possibility that a single scanning beam does not extend over the entire width of the bar code label.

Accordingly, an object of the present invention is to provide a novel recognition system in an optical reader system for reading out coded information.

Another object of the present invention is to provide a compact size optical bar code reader which ensures an accurate operation.

Still another object of the present invention is to provide an optical bar code reader system which can recognize the coded information even when a single scanning beam does not extend over the entire width of the bar code label.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a composition circuit is provided for combining a plurality of scan outputs, wherein each scanning beam output does not extend over the entire width of a bar code label, to obtain an estimated complete output corresponding to the bar code information. In a preferred form, a determination circuit is provided for determining whether any one of the scanning beams extends over the entire width of the bar code label. If an affirmative answer is obtained, a control circuit functions to give priority to the scan output derived from a scanning beam which extends over the entire width of the bar code label. If the affirmative answer is not obtained, the control circuit enables the composition circuit to obtain the estimated complete output through the use of the plurality of scan outputs.

BRIEF DESCRIPTION OF THE DRAWINGS

The present invention will be better understood from the detailed description given hereinbelow and the accompanying drawings which are given by way of illustration only, and thus are not limitative of the present invention and wherein.

DESCRIPTION OF THE PREFERRED EMBODIMENTS

Figure 1:
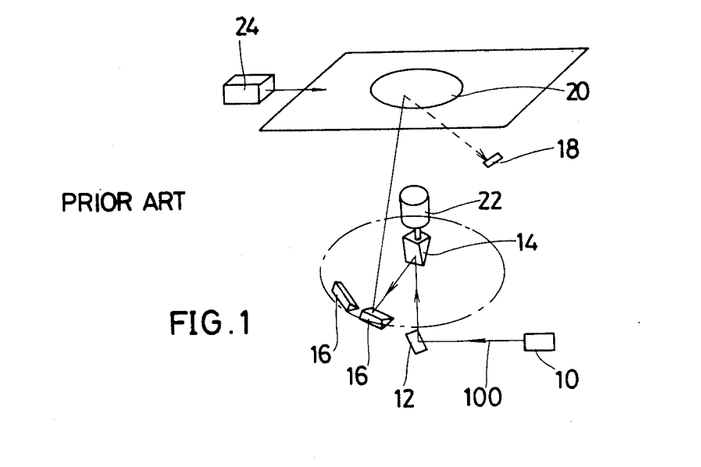
FIG. 1 is a schematic perspective view of an optical bar code reader of prior art.

A typical construction of a conventional optical bar code reader will be first described with reference to FIG. 1.

Figure 2:
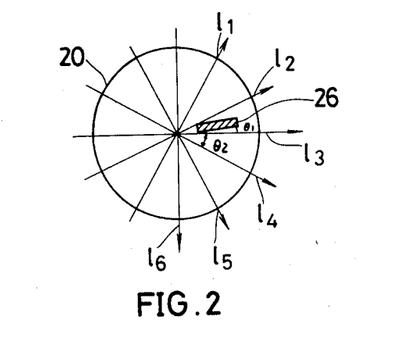
FIGS. 2, 3, 4 and 5 are schematic plan views showing relationships between the bar code location and the scanning beam direction in the optical bar code reader of FIG. 1.

The conventional optical bar code reader comprises a light source 10, a galvanomirror 12, a rotating mirror 14, a plurality of stationary mirrors 16 and a light responsive element 18. A light beam 100 emitted from the light source 10 is directed to the galvanomirror 12 which is driven to rotate by a drive system to adjust the location of a scanning beam on a scanning window 20. The light beam reflected by the galvanomirror 12 is incident to the rotating mirror 14 which is driven to rotate by a motor 22. The plurality of stationary mirrors 16 are aligned in a semicircular fashion to provide the scanning beams $l_1$ through $l_6$, on the scanning window 20, as shown in FIG. 2. A commodity article 24, on which a bar code label is disposed, is disposed on the scanning window 20 in order to read the bar code information through the use of the light responsive element 18.

A typical control system of the above-mentioned conventional optical bar code reader is disclosed in U.S. Pat. No. 3,978,317, "OPTICAL BAR CODE READER", issued on Aug. 31, 1976.

Figure 3:
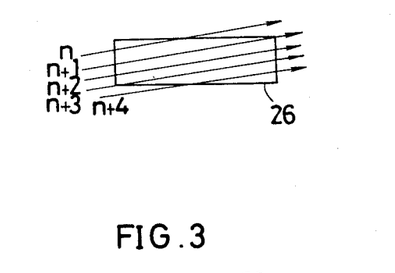
Figure 4:
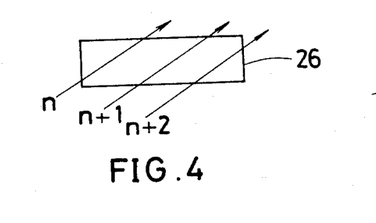

When the galvanomirror 12 is rotated, the scanning beam is shifted as shown in FIGS. 3 and 4. If the scanning beam extends over the entire width of a bar code label 26, as do the scanning beams n+1, n+2 and n+3 shown in FIG. 3, bar code information can be read out through the use of a single scanning beam selected from the scanning beams n+1, n+2 and n+3. However, there is a possibility that none of the scanning beams extends over the entire width of the bar code label 26 as shown in FIG. 4. In such a case, the commodity article 24 must be moved to provide a condition, wherein at least one scanning beam extends over the entire width of the bar code label 26.

The present invention provides a control system for ensuring an accurate read out operation even when the scanning beams read the bar code information in a fashion as shown in FIG. 4.

Figure 5:
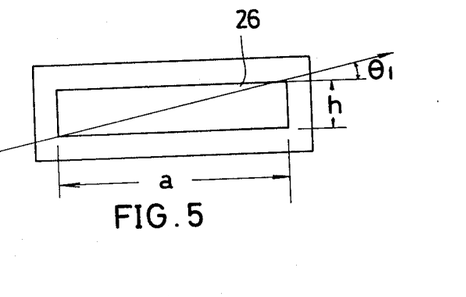

On the other hand, when the bar height h in the bar code label 26 becomes small, a division angle $\theta_2$ of the scanning beams must become small if any one of the scanning beams is to extend over the entire width of the bar code label 26. That is, the scanning division angle $\theta_2$ must satisfy the following condition when it is required to obtain a scanning beam extending over the entire width of the bar code label 26 (See FIG. 5).

$$\theta_2 \leq \theta_1$$

$$\theta_1 = \tan^{-1}(h/a)$$

where:
h is the bar height; and
a is the bar code label width.

It is not practical to considerably reduce the division angle $\theta_2$, because the number of stationary mirrors 16 must be considerably increased. This will not be suited for a compact size optical bar code reader.

Figure 6:
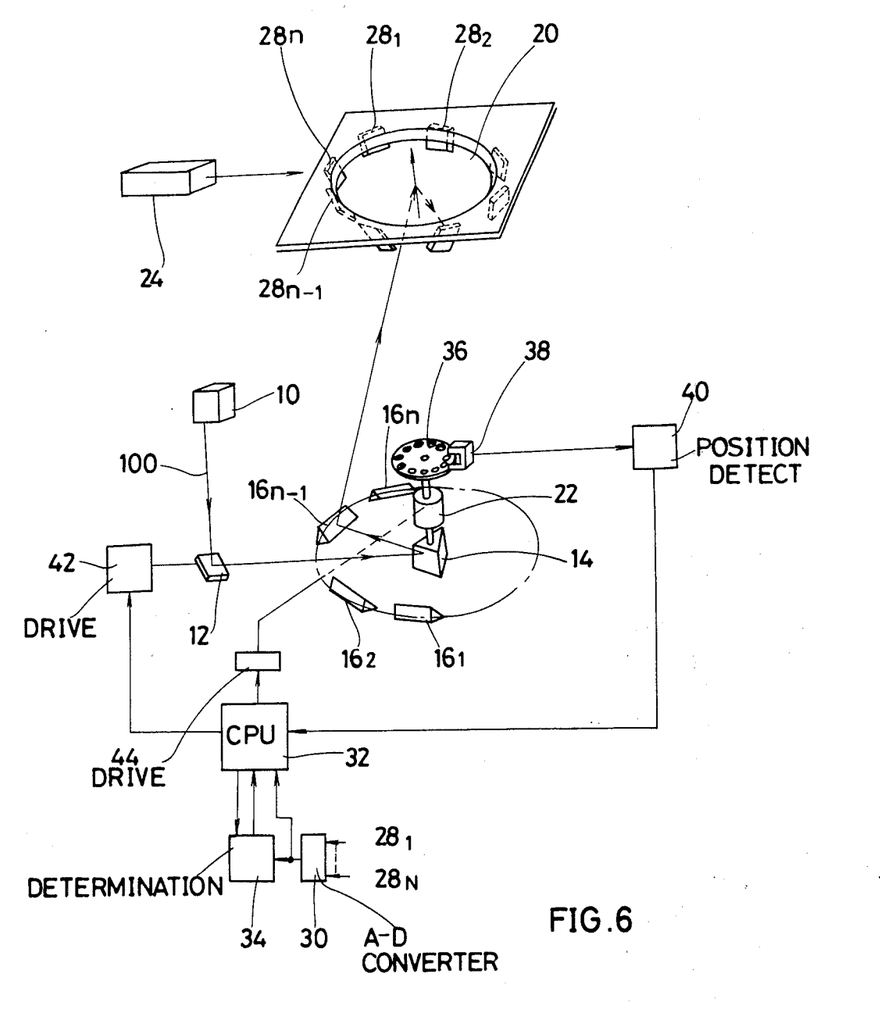
FIG. 6 is a combined perspective view and a block diagram of an embodiment of an optical bar code reader of the present invention.

FIG. 6 shows an embodiment of an optical bar code reader of the present invention. Like elements corresponding to those of FIG. 1 are indicated by like numerals.

The light beam reflected by the rotating mirror 14 is directed to stationary mirrors $16_1, 16_2, \ldots 16_{n-1}$ and $16_n$ to scan the bar code label disposed on the commodity article 24 which is placed on the scanning window 20. A plurality of light responsive elements $28_1, 28_2, \ldots 28_{n-1}$ and $28_n$ are provided for detecting a light reflected from the bar code label. Each output signal of the light responsive elements $28_1, 28_2, \ldots 28_{n-1}$ and $28_n$ is applied to an analog-to-digital converter 30, which provide a digital output signal to a central processor unit 32 and a determination circuit 34.

A timing plate 36 is fixed to a shaft of the motor 22 in order to detect which stationary mirror $16_i$ reflects the scanning beam. The timing plate 36 includes a plurality of apertures formed therein at locations which correspond to the locations of the stationary mirrors 16. A detection unit 38 is associated with the timing plate 36 to develop a timing pulse toward a position detection circuit 40. More specifically, the timing pulse is developed when the light beam reflected by the rotating mirror 14 reaches the leading edge of any one of the stationary mirrors 16. The position information derived from the position detection circuit 40 is applied to the central processor unit 32 for recognizing the bar code label position. That is, the central processor unit 32 functions to determine which scanning beam is presented when the analog-to-digital converter 30 develops the digital output signal. Further, the central processor unit 32 performs the time calculation operation in response to the timing pulse derived from the detection unit 38, thereby determining the location of the scanning beam on the bar code label.

After determination of the bar code location, the central processor unit 32 detects whether the bar code information is accurately read by the determination circuit 34. When the determination circuit 34 indicates that the bar code information is accurately read, the data input is directly transferred to the central processor unit 32. If the determination circuit 34 indicates that the bar code information is not accurately read, the central processor unit 34 develops a control signal toward a drive circuit 42 to slightly rotate the galvanomirror 12. In this way, the scanning beams n, n+1 and n+2 shown in FIG. 4 are obtained.

The determination circuit 34 indicates that the bar code information is accurately read when a single scanning beam extends over the entire width of the bar code label. When the bar code label is located in a position such that none of the scanning beams extend over the entire width of the bar code label, the central processor unit 32 functions to combine a plurality of data outputs obtained by the scanning beams, for example, n, n+1 and n+2 of FIG. 4, to get a complete data corresponding to the entire bar code. The central processor unit 32 further develops a control signal toward a driver circuit 44 to control the revolution of the motor 22.

The central processor unit 32 may be implemented with a "Z-80.CPU" manufactured by SHARP CORPORATION of Japan.

Figure 7:
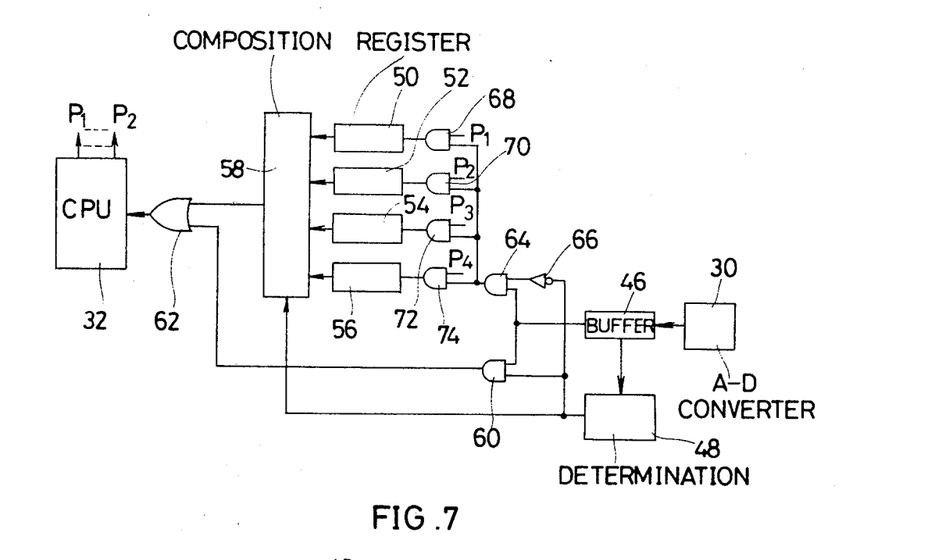
FIG. 7 is a block diagram of an essential part of the optical bar code reader of FIG. 6.

FIG. 7 shows a detailed construction of the determination circuit 34. Like elements corresponding to those of FIG. 6 are indicated by like numerals.

The determination circuit 34 includes a buffer register 46, a determination unit 48, four registers 50, 52, 54 and 56, and a composition circuit 58. The digital output signal derived from the analog-to-digital converter 30 is introduced into the buffer register 46. The determination unit 48 functions to detect, in response to the instruction developed from the central processor unit 32, whether the digital output signal corresponds to the entire bar code information. If an affirmative answer is obtained by the determination unit 48, the determination unit 48 develops a high level control signal to enable an AND gate 60. Accordingly, the digital output data temporarily stored in the buffer register 46 is transferred to the central processor unit 32 through the AND gate 60 and an OR gate 62.

If the determination unit 48 detects that the digital data temporarily stored in the buffer register 46 does not correspond to the entire bar code information, the determination unit 48 develops a low level control signal to enable another AND gate 64 via an inverter 66. Accordingly, the digital data temporarily stored in the buffer register 46 is transferred to one of the four registers 50, 52, 54 and 56 via one of AND gates 68, 70, 72 and 74. The AND gates 68, 70, 72 and 74 are controlled by gate signals $P_1, P_2, P_3$ and $P_4$ which are developed from the central processor unit 32 in response to the position information derived from the position detection circuit 40. In this way, incomplete digital data are sequentially introduced into the registers 50, 52, 54 and 56, and then, these digital data are combined with each other by the composition circuit 58 to obtain an estimated complete data corresponding to the entire bar code information. The thus obtained complete data is applied to the central processor unit 32 via the OR gate 62. When a complete bar code data is introduced into the buffer register 46, the determination unit 48 develops the control signal to clear the data stored in the registers 50, 52, 54 and 56, and to transfer the complete bar code data stored in the buffer register 46 to the central processor unit 32.

Figure 8:
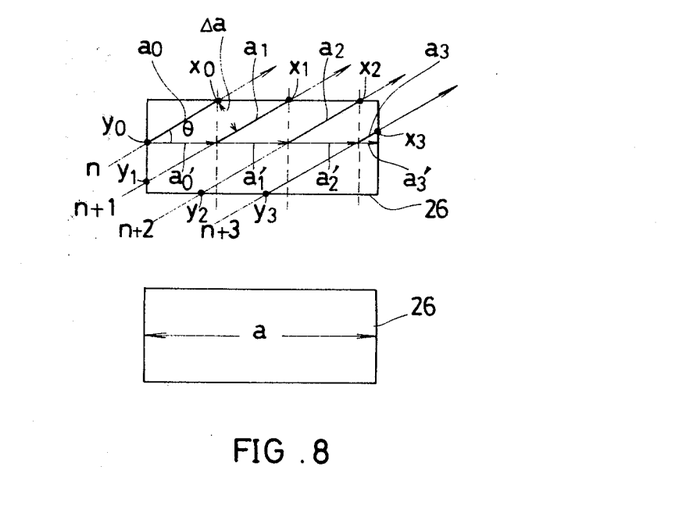
FIG. 8 is a schematic plan view for explaining an operation principle of the optical bar code reader of FIG. 6.

An operation mode of the composition circuit 58 will be described with reference to FIG. 8. When the scanning beams n, n+1, n+2 and n+3 extend across only a portion of the bar code label 26 as shown in FIG. 8, the complete bar code information can be obtained by combining components $a_0', a_1', a_2'$ and $a_3'$ provided that the location of each of the scanning beams n, n+1, n+2 and n+3 is detected. More specifically, the complete bar code data is obtained through the use of the following equation.

$$a = \cos\theta \cdot (a_0 + a_1 + a_2 + a_3) \tag{1}$$

Figure 9:
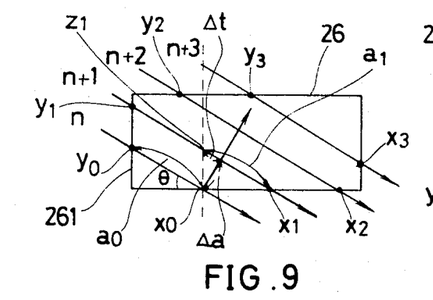
FIGS. 9, 10, 11 and 12 are schematic plan views for explaining operation modes of the optical bar code reader of FIG. 6.
Figure 10:
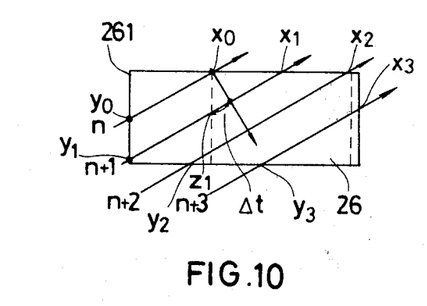
Figure 11:
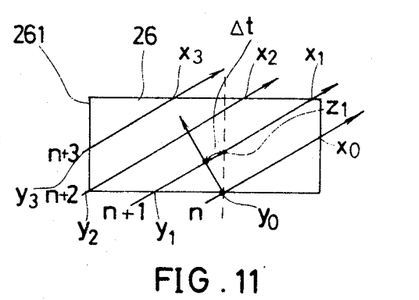
Figure 12:
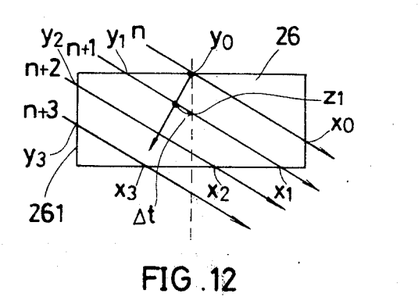

Four conditions can be considered with respect to the direction of the scanning beams as shown in FIGS. 9, 10, 11 and 12. The scanning beam n reaches the bar code label 26 at a time $y_0$, and scans the bar code label 26 between times $y_0$ and $x_0$. The scanning beam $n+1$ reaches the bar code label 26 at a time $y_1$, and passes the bar code label 26 at a time $x_1$. The scanning beam $n+2$ reaches the bar code label 26 at a time $y_2$, and passes the bar code label 26 at a time $x_2$. The scanning beam $n+3$ reaches the bar code label 26 at a time $y_3$, and passes the bar code label 26 at a time $x_3$. These time data are obtained by the central processor unit 32 through the use of the timing pulse derived from the detection unit 38. FIGS. 9 and 10 show a condition, wherein a leading edge 261 of the bar code label 26 is scanned in the order of n, $n+1$, $n+2$ and $n+3$. In this case, $x_0 > Z_1$, and $Z_1 = x_0 - \Delta t$. FIGS. 11 and 12 show a condition, wherein the leading edge 261 is scanned in the order of $n+3$, $n+2$, $n+1$ and n. In this case, $y_0 < Z_1$, and $Z_1 = y_0 + \Delta t$.

$$\Delta t = \tan \theta \cdot \Delta a \qquad (2)$$

where:

$\theta$ is an angle formed between the scanning beam and the bar code label; and $\Delta a$ is a scanning beam pitch.

The time difference $\Delta t$ is required to obtain the estimated complete bar code information through the use of the equation (1). That is, the equation (1) requires the information $a_0$, $a_1$, $a_2$ and $a_3$. The scanning beam pitch $\Delta a$ is a preselected value determined by the rotation control angle of the galvanomirror 12. The scanning beam angle $\theta$ is obtained through the use of the following equation.

$$\theta = \tan^{-1}(\Delta t/\Delta a) = \tan^{-1}|(y_0 - y_1)/\Delta a| \qquad (3)$$

where:

$y_0 - y_1 > 0$ ... (FIGS. 9 and 10)

$y_0 - y_1 < 0$ ... (FIGS. 11 and 12)

That is, the time difference $\Delta t$ is calculated when the time information of $y_0$ and $y_1$ is obtained in the central processor unit 32.

When the scanning beam angle $\theta$ is calculated in the central processor unit 32, and the information $a_0$, $a_1$, $a_2$ and $a_3$ is obtained in the central processor unit 32, the estimated complete bar code information can be obtained through the use of the equation (1).

Figure 13:
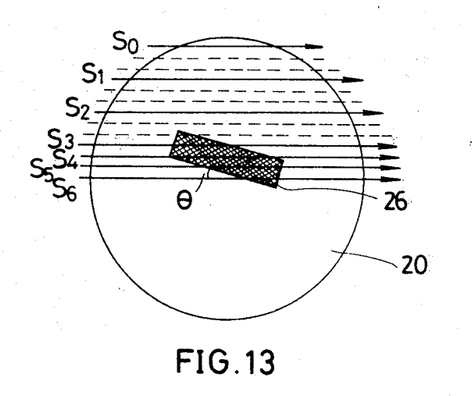
FIGS. 13, 14 and 15 are schematic plan views showing relationships between the bar code location and the scanning beam density in the optical bar code reader of FIG. 6.

A system operation of the optical bar code reader of the present invention will be described with reference to FIGS. 13, 14 and 15.

When the commodity article 24 carrying the bar code label 26 is disposed on the scanning window 20, the light source 10 is energized and the motor 22 is energized to rotate the rotating mirror 14 at a constant velocity. The galvanomirror 12 is driven to rotate to provide scanning beams $S_0$, $S_1$, $S_2$, $S_3$ ... shown in FIG. 13. The galvanomirror rotation is controlled at a higher speed before a portion of the bar code label 26 is detected (see the scanning beams $S_0$, $S_1$, $S_2$ and $S_3$). When the portion of the bar code label 26 is detected by the scanning beam $S_3$, the galvanomirror rotation is changed to a lower speed mode to provide fine pitch scanning beams $S_4$, $S_5$ and $S_6$ as shown in FIG. 13. The composition operation is conducted on the data obtained by the scanning beams $S_3$, $S_4$, $S_5$ and $S_6$ to get the estimated complete bar code information.

Figure 14:
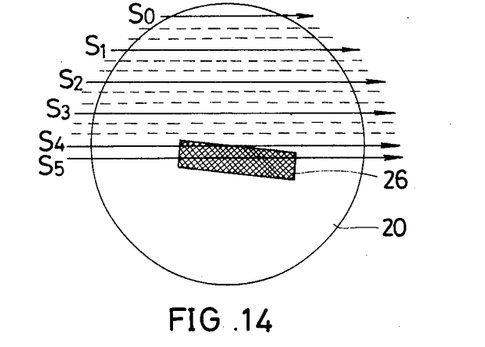

When the complete bar code information is obtained by a single scanning beam $S_5$ as shown in FIG. 14, the composition operation is interrupted and the priority is applied to the data derived from the single scanning beam $S_5$.

Figure 15:
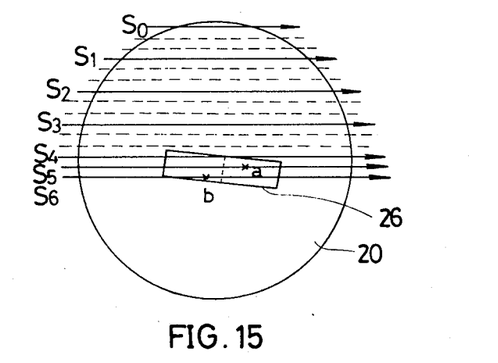

In case where a defect is found in a read out data even when a single scanning beam $S_5$ extends over the entire width of the bar code label 26 as shown in FIG. 15, the composition operation is conducted on the data derived from the scanning beams $S_5$ and $S_6$. In this case, the composition operation is accurately conducted even when another defect is found in a read out data derived from the following scanning beam $S_6$ as long as two defects are not positioned in the same column.

Figures 16, 17:
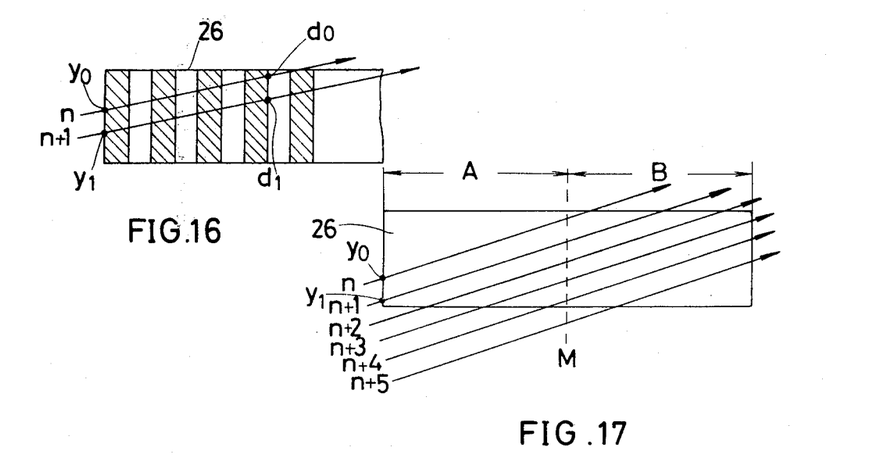
FIGS. 16 and 17 are schematic plan views for explaining operation modes of the optical bar code reader of FIG. 6.

When the scanning beam pitch is considerably shorter than the bar code label size as shown in FIG. 16, the scanning beam angle $\theta$ and the time difference $\Delta t$ can be obtained through the use of the read out data (time information) in the following way.

$$\theta = \tan^{-1}(\Delta t/\Delta a) = \tan^{-1}|(d_0 - d_1)/\Delta a|$$

Figure 18:
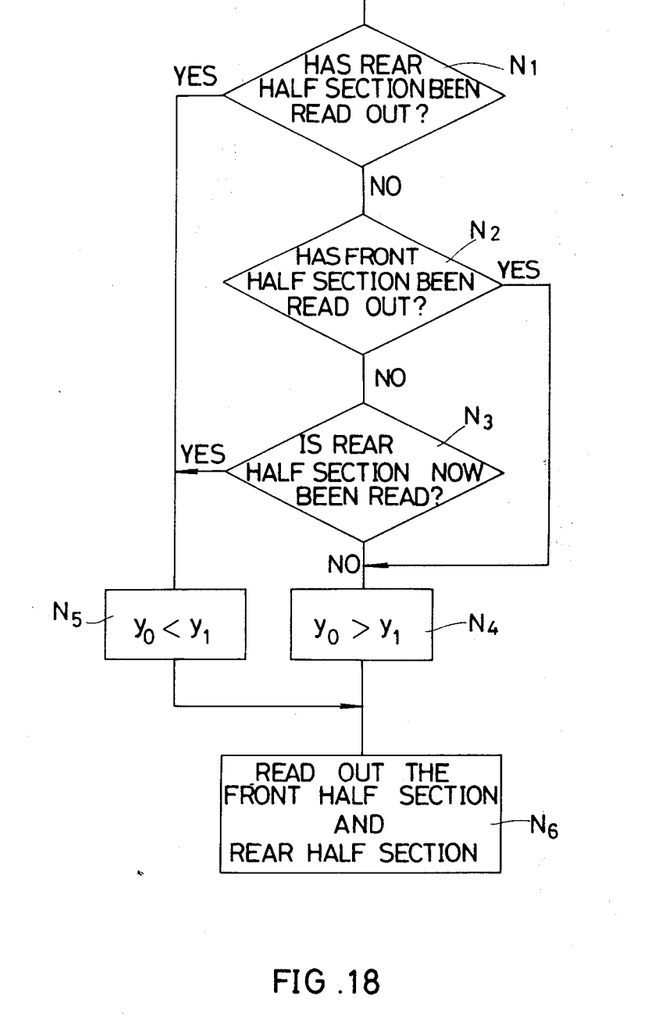
FIG. 18 is a flow chart for explaining an operation mode of the optical bar code reader of FIG. 6.

When the bar code is the "WPC" type, wherein a front half section A and a rear half section B have symmetrical data as shown in FIG. 17, the system operation is conducted in accordance with a program depicted in a flow chart of FIG. 18. Through the use of steps $N_1$, $N_2$ and $N_3$, relationships between the bar code label and scanning direction are determined at a step $N_4$ or a step $N_5$. Then, the front half section and the rear half section data is read out at a step $N_6$, thereby combining the data. More specifically, the bar code data read out by, for example, the scanning beam n and the scanning beam $n+4$ in FIG. 17 are combined with each other to provide the estimated complete bar code data.

The invention being thus described, it will be obvious that the same may be varied in many ways. Such variations are not to be regarded as a departure from the spirit and scope of the invention, and all such modifications are intended to be included within the scope of the following claims.

What is claimed is:

1. An optical bar code reader comprising:

scanning means for providing a plurality of scanning beams separated from each other by a predetermined distance, each said beam scanning successive randomly oriented portions of a bar code label;

light receiving means for developing an output signal in response to each beam developed by said scanning means and scanning at least a portion of the bar code label;

processor means for receiving signals developed by said light receiving means representative of said bar code;

means for combining a plurality of signals developed by said light receiving means for forming a combined signal representative of the entire bar code and for transferring said combined signal to said processor means, said combining means comprising a plurality of storing means for storing a plurality of signals developed in response to scanning beams which scan less than the entire bar code label and composition means for combining said plurality of signals to form said combined signal; and means for determining if a signal developed by said light receiving means in response to any scanning beam represents the entire bar code, for interrupting operation of said combining means upon determination that a signal developed by said light receiving means represents the entire bar code, and for transferring such a signal representing the entire bar code to said processor means.

2. An optical bar code reader as in claim 1, wherein said scanning means comprises means for providing a plurality of unidirectional parallel scanning beams.

3. An optical bar code reader as in claim 1, wherein said plurality of storing means stores signals developed by a plurality of scanning beams, each of which has scanned less than one-half of said bar code label.

* * * * *